(12) United States Patent
Giaconi et al.

(10) Patent No.: US 10,404,444 B2
(45) Date of Patent: Sep. 3, 2019

(54) SYSTEMS AND METHODS FOR THE DESIGN AND IMPLEMENTATION OF INPUT AND OUTPUT PORTS FOR CIRCUIT DESIGN

(71) Applicant: CHRONOS TECH LLC, San Diego, CA (US)

(72) Inventors: Stefano Giaconi, San Diego, CA (US); Giacomo Rinaldi, San Diego, CA (US); Matheus Trevisan Moreira, San Diego, CA (US); Matthew Pryor, San Diego, CA (US); David Fong, San Diego, CA (US)

(73) Assignee: CHRONOS TECH LLC, San Diego, CA (US)

( * ) Notice: Subject to any disclaimer, the term of this patent is extended or adjusted under 35 U.S.C. 154(b) by 0 days.

(21) Appl. No.: 16/209,823

(22) Filed: Dec. 4, 2018

(65) Prior Publication Data

US 2019/0116020 A1    Apr. 18, 2019

Related U.S. Application Data

(63) Continuation of application No. 15/645,917, filed on Jul. 10, 2017, now Pat. No. 10,181,939.

(Continued)

(51) Int. Cl.
| | | |
|---|---|---|
| *H04L 7/00* | (2006.01) | |
| *H04L 12/24* | (2006.01) | |
| *H04L 12/933* | (2013.01) | |
| *H04L 12/851* | (2013.01) | |
| *H04L 12/947* | (2013.01) | |
| *H04L 12/935* | (2013.01) | |
| *H04L 12/861* | (2013.01) | |

(Continued)

(52) U.S. Cl.
CPC .......... *H04L 7/0016* (2013.01); *H04L 7/0008* (2013.01); *H04L 41/06* (2013.01); *H04L 47/24* (2013.01); *H04L 49/101* (2013.01); *H04L 49/258* (2013.01); *H04L 49/30* (2013.01); *H04L 49/90* (2013.01); *H04L 45/302* (2013.01); *H04L 45/74* (2013.01)

(58) Field of Classification Search
CPC ..... H04L 7/0016; H04L 7/0008; H04L 41/06; H04L 47/24; H04L 49/101; H04L 49/258; H04L 49/30; H04L 49/90; H04L 45/302; H04L 45/74
See application file for complete search history.

(56) References Cited

U.S. PATENT DOCUMENTS

| | | | |
|---|---|---|---|
| 4,189,625 A | 2/1980 | Strandberg | |
| 5,689,644 A * | 11/1997 | Chou | .......... G06F 13/385 |
| | | | 370/352 |

(Continued)

*Primary Examiner* — Duc C Ho
(74) *Attorney, Agent, or Firm* — Procopio; Mark W. Catanese; Noel C. Gillespie

(57) ABSTRACT

Systems and methods for providing input and output ports to connect to channels are provided. Input and output ports are the basic building blocks to create more complex data routing IP blocks. By aggregating these modular ports in different ways, different implementations of crossbar or Network on Chip (NoC) can be implemented, allowing flexible routing structure while maintaining all the benefits of channels such as robustness against delay variation, data compression and simplified timing assumptions.

19 Claims, 12 Drawing Sheets

Related U.S. Application Data

(60) Provisional application No. 62/360,225, filed on Jul. 8, 2016.

(51) Int. Cl.
    *H04L 12/741* (2013.01)
    *H04L 12/725* (2013.01)

(56) References Cited

U.S. PATENT DOCUMENTS

| | | | |
|---|---|---|---|
| 6,208,644 B1 * | 3/2001 | Pannell | H04L 47/125 |
| | | | 370/389 |
| 8,365,113 B1 | 1/2013 | Bhardwaj et al. | |
| 9,977,852 B2 | 5/2018 | Giaconi et al. | |
| 9,977,853 B2 | 5/2018 | Giaconi et al. | |
| 2003/0035496 A1 | 2/2003 | Noda | |
| 2004/0151209 A1 | 8/2004 | Cummings et al. | |
| 2005/0180514 A1 | 8/2005 | Choi et al. | |
| 2005/0200388 A1 | 9/2005 | Har et al. | |
| 2008/0285743 A1 | 11/2008 | Yokota et al. | |
| 2008/0304430 A1 | 12/2008 | Zhuyan | |
| 2009/0106719 A1 | 4/2009 | Stevens | |
| 2010/0285743 A1 | 11/2010 | Li et al. | |
| 2016/0188522 A1 | 6/2016 | Hilgemberg Pontes et al. | |
| 2017/0091130 A1 | 3/2017 | Matsunaga | |
| 2017/0180800 A1 * | 6/2017 | Mayrand | H04N 21/44218 |
| 2017/0308721 A1 | 10/2017 | Pedersen | |
| 2018/0109415 A1 | 4/2018 | Han et al. | |

* cited by examiner

SYSTEMS AND METHODS FOR THE DESIGN AND IMPLEMENTATION OF INPUT AND OUTPUT PORTS FOR CIRCUIT DESIGN

RELATED APPLICATIONS INFORMATION

This present application is a Continuation application of patent application Ser. No. 15/645,917 filed Jul. 10, 2017, which in turn claims the benefit of priority under 35 U.S.C. 119(e) to Provisional Patent Application Ser. No. 62/360,225, titled "Systems and Methods for the Design and Implementation of input and output ports for Circuit Design," filed Jul. 8, 2016. Both of which are incorporated herein in their entirety as if set forth in full.

This application is also related to U.S. patent application Ser. No. 15/344,416 titled: "Application Specific Integrated Circuit Interconnect," filed Nov. 4, 2016; U.S. patent application Ser. No. 15/344,420 titled: "Application Specific Integrated Circuit Link," filed Nov. 4, 2016; U.S. patent application Ser. No. 15/344,441 titled: "System and Method for Application Specific Integrated Circuit Design," filed Nov. 4, 2016; and patent application Ser. No. 15/644,696, titled: "An ASIC Design Methodology for Converting RTL HDL to a Light Netlist," filed Jul. 7, 2017. All of the above are incorporated herein in their entirety as if set forth in full.

BACKGROUND

1. Technical Field

The various embodiments described herein are related to application specific integrated circuits (ASICs), and more particularly to the design of various ASICs.

2. Related Art

Continuing advances in semiconductor device fabrication technology have yielded a steady decline in the size of process nodes. For example, 22 nanometer (nm) process nodes were introduced in 2012 but were quickly succeeded by 14 nm fin field-effect transistors (FinFETs) in 2014 while 5 nm process nodes are projected for 2020.

The decrease in process node size allows a growing number of intellectual property (IP) cores or IP blocks to be placed on a single ASIC chip. That is, modern ASIC designs often spread numerous process nodes across a comparatively large silicon die, and include combinations of IP blocks and logic functions. At the same time, modern technology also requires increased connectivity and large data transfers between various IP blocks. In addition, modern ASIC chips frequently include multiple clock domains in order to leverage multi-core implementations. Thus, one or more clock signals may need to be distributed across the chip in a manner that minimizes clock skew. For instance, the edge of the clock signal received at a logic block located near a clock source should be aligned with those received at more distant logic blocks.

Conventionally, a balanced clock signal distribution (i.e., timing closure) is achieved by inserting buffers. For example, pursuant to a traditional ASIC design flow, after floor planning and placing various IP blocks, a clock tree (i.e., a clock distribution network) may be synthesized and buffers may be added along the signal path from a clock source to various IP blocks according to the clock tree. In fact, timing closure for a clock signal that is distributed over a large and complex ASIC design typically requires the strategic placement of numerous buffers. Moreover, the distribution of a clock signal is also highly susceptible to both systematic and random variations. In particular, proper timing closure must account for the effects of on-chip variations that arise as a result of different process, voltage, and temperature (PVTs) and operation modes, which would otherwise introduce additional clock skews. As such, the most laborious and time consuming aspect of conventional ASIC design tends to be clock alignment. Clock tree synthesis and timing closure generally require significant manual intervention. In addition, the mechanisms (i.e., buffers) used to balance the clock across an ASIC chip generally consume a majority of the power in any conventional ASIC design.

SUMMARY

Apparatuses and methods for ASIC design are provided.

According to one aspect, an input port configured to accept a bundle of channels at an input and to convert and route the bundle of channels to a plurality of outputs, the input port comprising: a converter coupled with the bundle of channels at the input and configured to convert input encoding associated with data streams provided via the bundle of input channels to the encoding desired within an associated IP block; a buffer stage coupled with the converter configured to improve throughput for the data-path; a router configured to decompress address and then forward the data streams to the appropriate output of the plurality of outputs; a Quality of Service (QOS)/Fault Tolerant (FT) block configured to influence the routing selection for the data streams based on routing priority for resource sharing so that QoS is maintained, to avoid faulty link paths, or both; and output buffers configured to improve throughputs.

According to another aspect, an output port configured to accept multiple bundles of channels at an input and to arbitrate and convert one of the bundles of channels to an associated output, the output port comprising: buffer stages configured to improve data throughput for data streams associated with the multiple bundles of input channels; an arbiter configured to select which of the multiple bundle of channels go to an optional output buffer; a QOS/FT block configured to influence the arbitration based on routing priority for resource sharing so that QoS is maintained, to avoid faulty link paths, or both; an optional output buffer configured to improve throughputs; and a converter configured to convert data encoding for the data streams to the encoding desired at the associated output.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

This embodiments described herein disclose independent input and output ports configured for connecting to channels, which can be configured and designed in accordance with the systems and methods described in the patent applications incorporated herein. Further, by aggregating these modular input and output ports in different ways, other unique circuit topologies can be achieved, such as different implementations or architectures of a crossbar or Network on Chip (NoC), some of which are described in more detail below.

Figure 1:
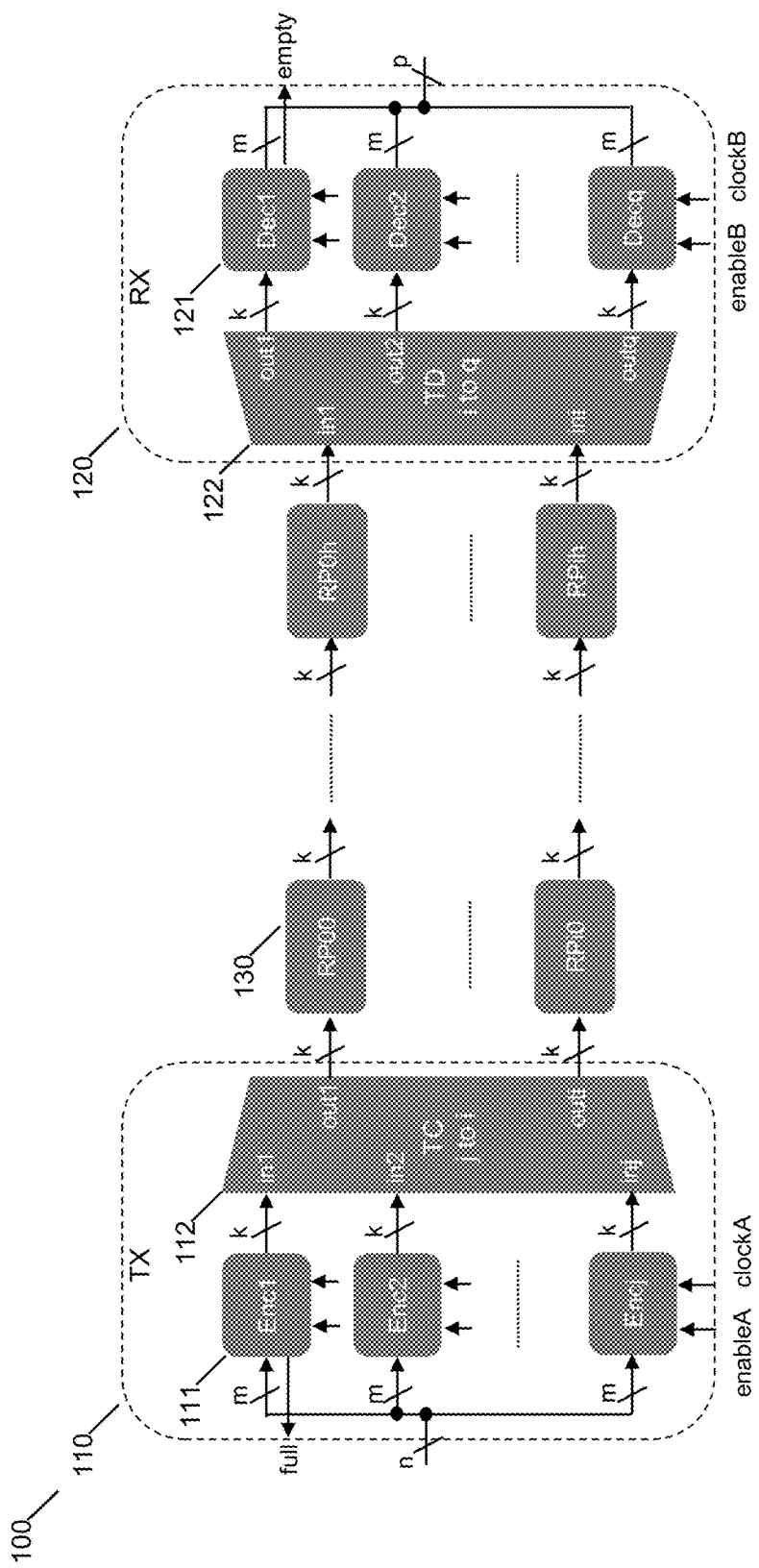
FIG. 1 is a general block diagram illustrating a possible embodiment of a channel in accordance with one embodiment.

FIG. 1 shows a channel, 100, which is an ASIC interconnect that allows transmitter blocks to send data to receiver blocks. Channels 100 stand out by relying on a reduced set of timing assumptions and being robust against delay variations. Channels 100 can achieve this by transmitting data using delay insensitive (DI) codes and quasi-delay-insensitive (QDI) logic. In this way, channels 100 are insensitive to all wire and gate delay variations, but for those belonging to a few specific forking logic paths called isochronic forks. Also, a unique characteristic of a channel 100, when compared to conventional solutions, is that a channel 100 uses temporal compression in its internal paths to reduce the overheads of QDI logic and efficiently transmit data. In fact, data can be compressed using different ratios, which can be any rational number, as long as a technology specific maximum frequency restriction is respected. In this way, a channel 100 can be defined by the combination of a DI code, and related handshake protocol, a temporal compression ratio and the hardware required to encode, decode, encrypt, decrypt, compress, decompress and transmit data.

Figure 2:
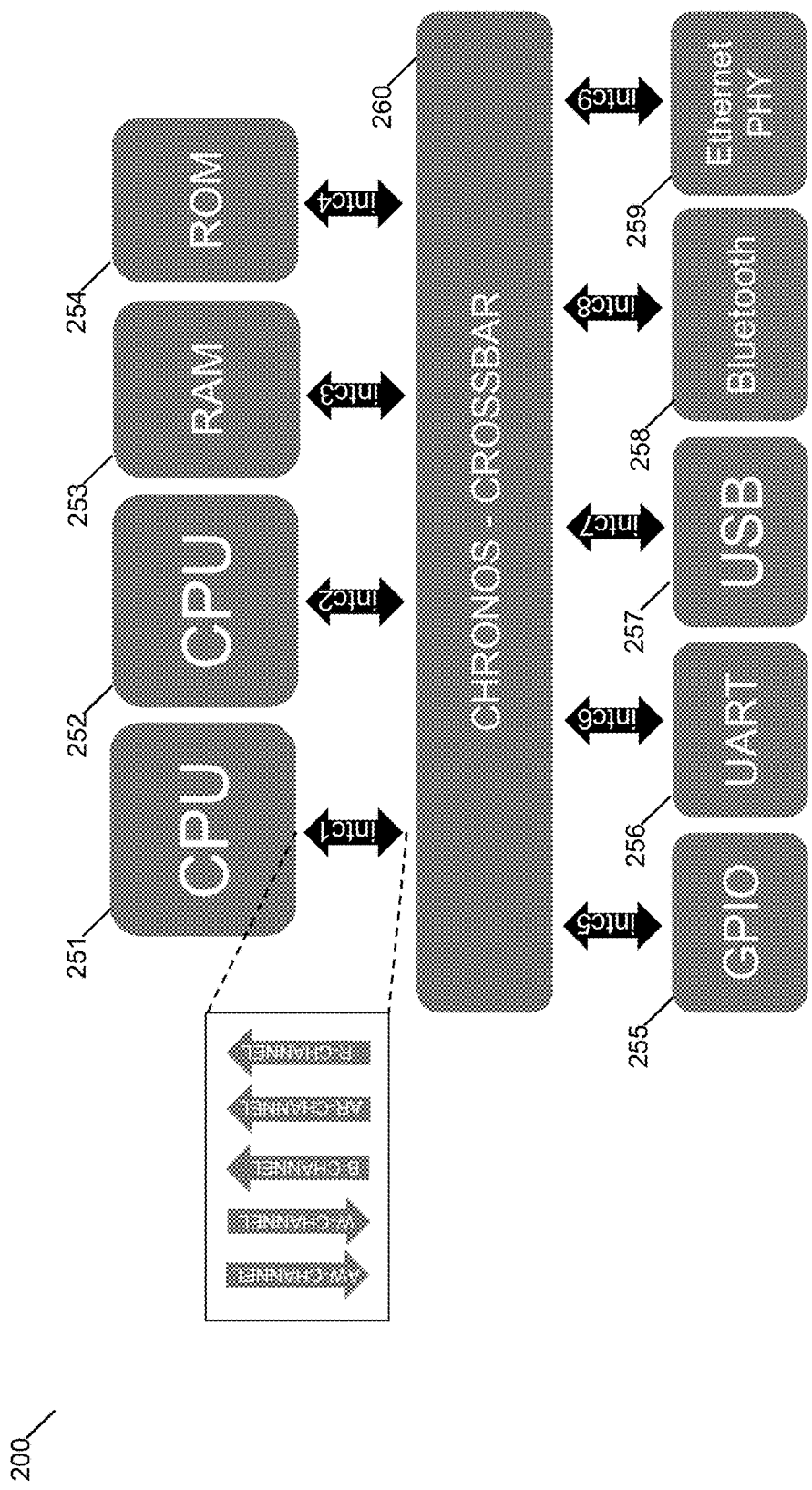
FIG. 2 is a general block diagram of a possible embodiment of a SoC connected through channels, such as described in FIG. 1 and a crossbar in accordance with certain embodiments.

FIG. 2 shows different IP blocks such as CPUs (251, 252), RAM (253), ROM (254), GPIO (255), UART (256), USB (257), Bluetooth (258), and Ethernet PHY (259) connected through bundles of channels 100 to a crossbar (260). Input and output ports as described below can be used to interface the various IP blocks and the crossbar 620.

Figure 3:
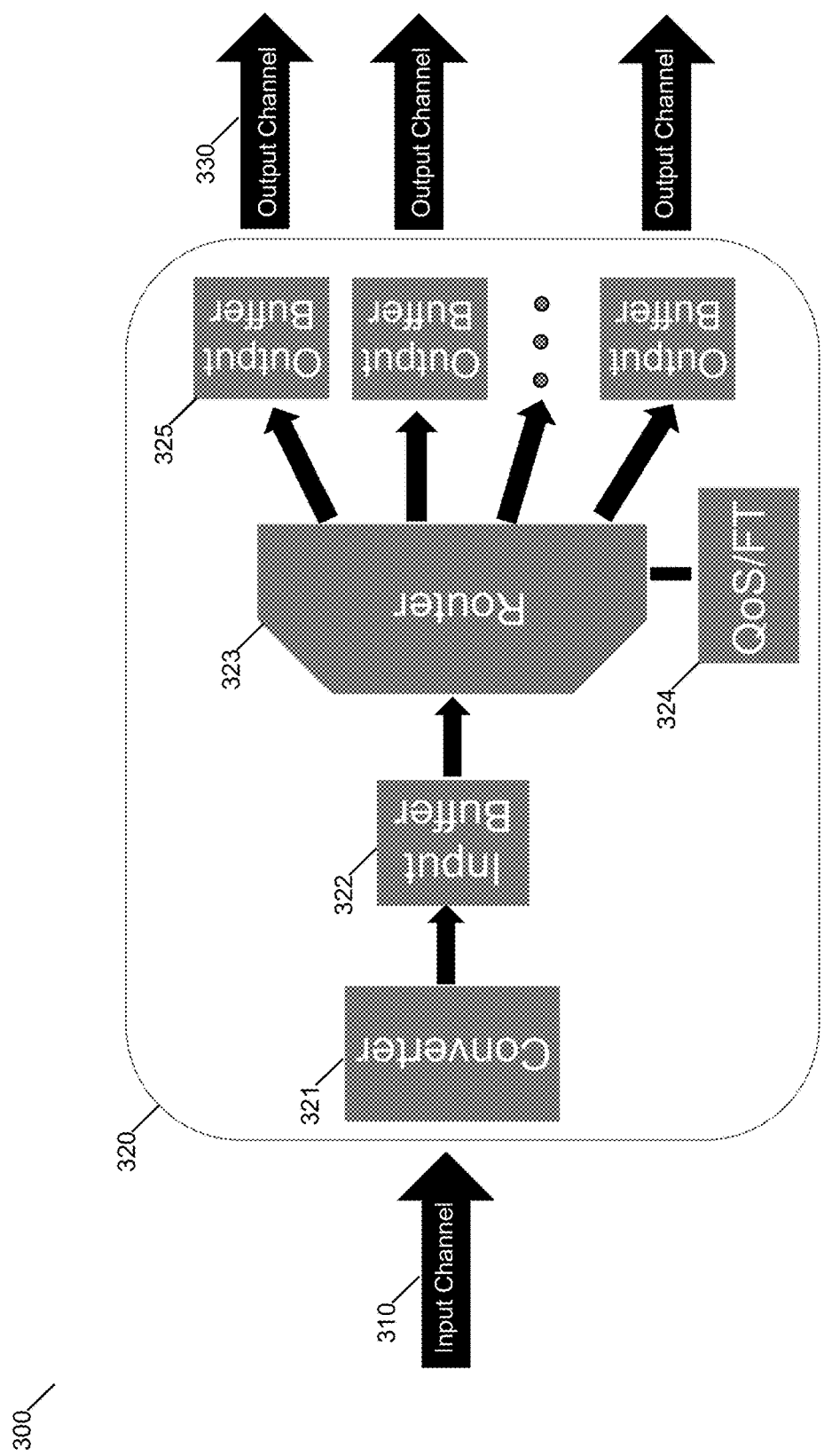
FIG. 3 is a general block diagram illustrating a possible embodiment of an input port in accordance with one example embodiment.

The basic structure of an input port 300, or routing port configured in accordance with one example embodiment is shown in FIG. 3. In this embodiment, input channel 310 can be a bundle of channels configured in accordance with the implementation of channel 100 above, for example, representing address and data busses. A converter 321 can be configured to care of converting input channel 310 to the appropriate encoding selected for the associated IP block, e.g., robust versus light. The signal proceeds towards an optional input buffer 322, which can be included in order to maximize throughput, and then it reaches the router 323. The router 323 takes care of decompressing the address information, if the compression ratio used in the channel was greater than 1, in order to enable proper routing, and then forwards the data stream to the proper output buffer port 325 to finally reach the bundle of output channels 330. The routing path can also be influenced by the QoS/Fault Tolerant (FT) block 324 to enable faster routing and/or to avoid broken link connections and/or the Quality of Service (QoS) information to prioritize the use of virtual channels to maintain bandwidth requirements.

Figure 4:
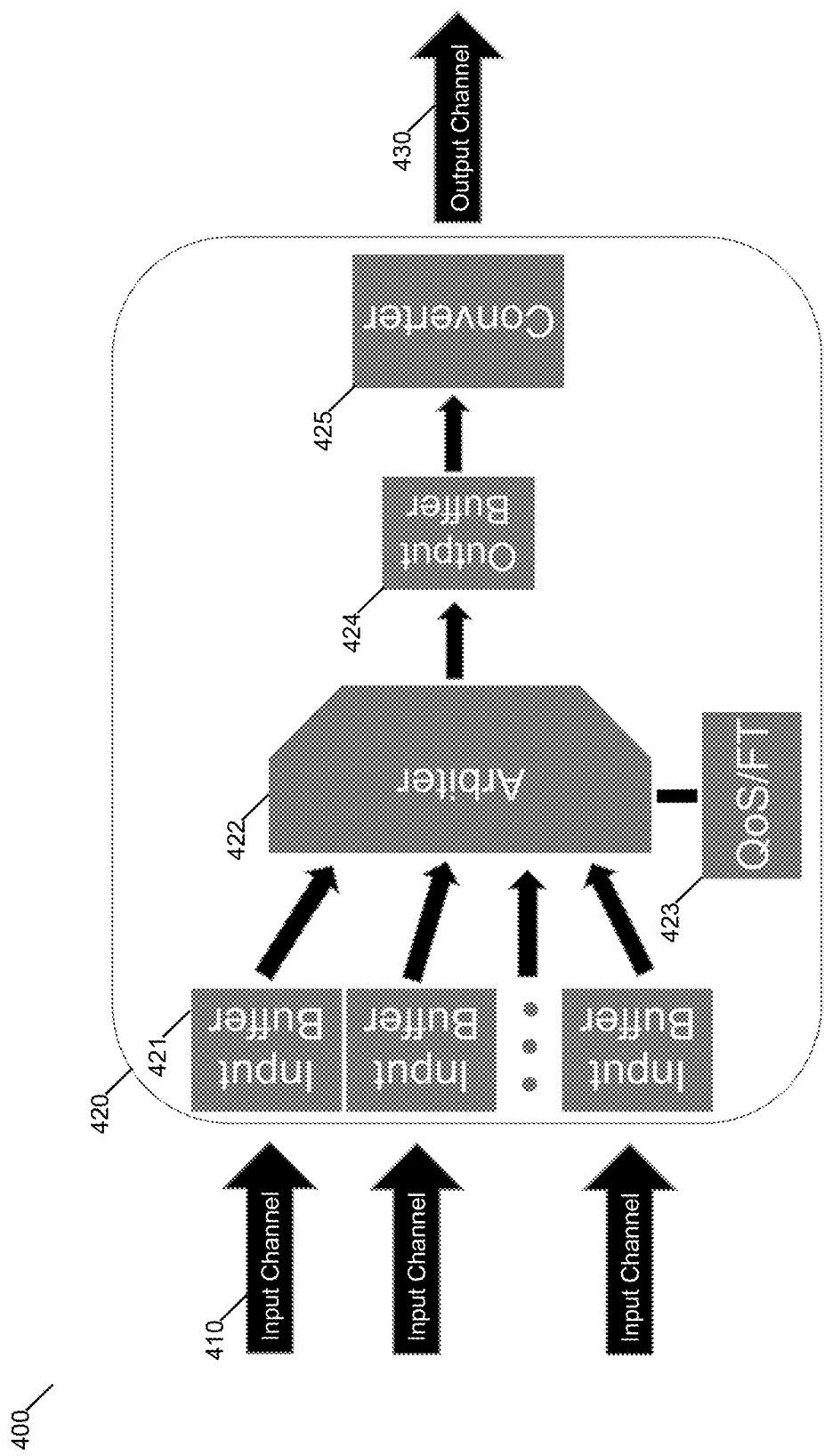
FIG. 4 is a general block diagram illustrating a possible embodiment of an output port in accordance with one example embodiment.

The architecture of an output port, or arbitering port 400 configure din accordance with one example embodiment is depicted in FIG. 4. In this embodiment, the input 410, and output 430 channels represent a bundle of channels that can be configured in accordance with the channel as described above. The signal is fed through the input buffers 421, into an arbiter 422, which selects which channel to pass to the optional output buffer 424, which can be configured to maximize speed. The arbiter 422 also makes sure that the correct compression ratio is restored for channels involved in the routing decisions, e.g., address channels. Within the arbiter 422, there is a counter for each arbitrated channel to ensure fair, round robin, or prioritized arbitration depending upon the QoS scheme. Moreover, the QoS/FT block 423 can influence arbitration, e.g. by adjusting the priority for concurrent or parallel requests from different channels to ensure QoS. The converter at the output 425 is configured to take care of converting the signal to the appropriate channel signaling on the outside of the associated IP block, e.g., light versus robust.

Figure 5:
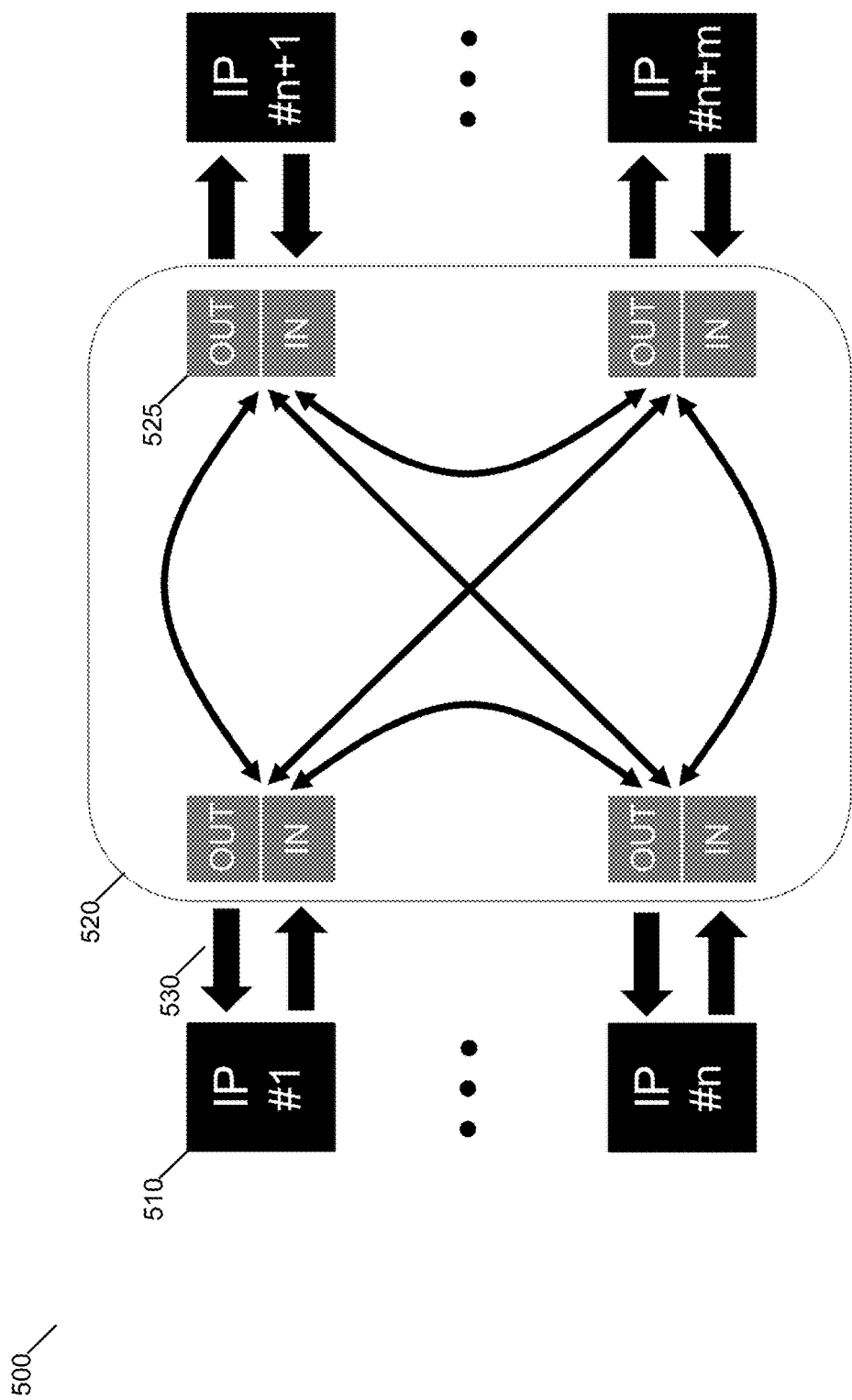
FIG. 5 is a diagram illustrating an example crossbar that uses the input and output ports of FIGS. 3 and 4 in accordance with one example embodiment.
Figure 6:
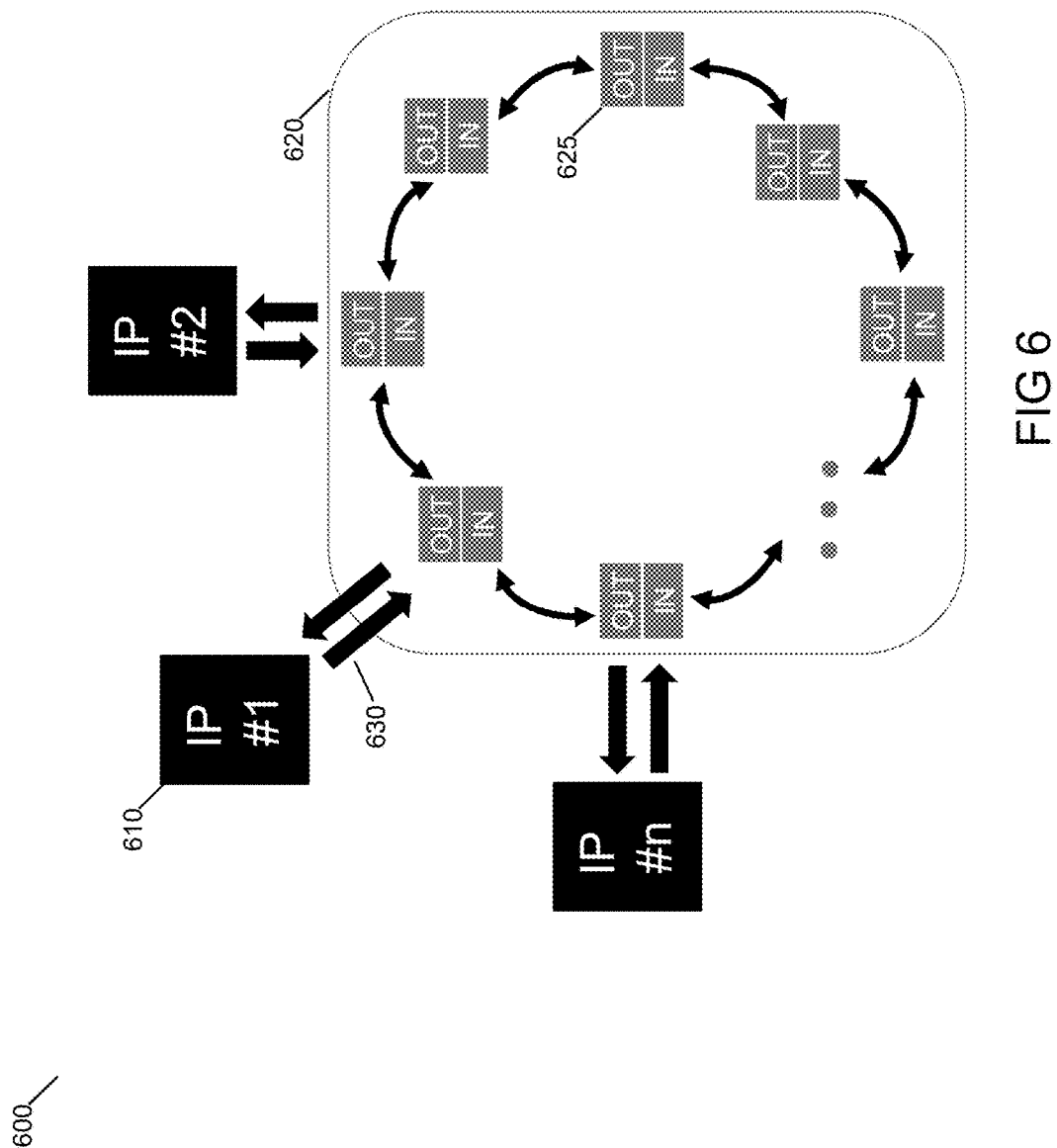
FIG. 6 is a diagram illustrating a ring topology for a Network on Chip (NoC) implementation that uses the input and output ports of FIGS. 3 and 4 in accordance with one example embodiment.
Figure 7:
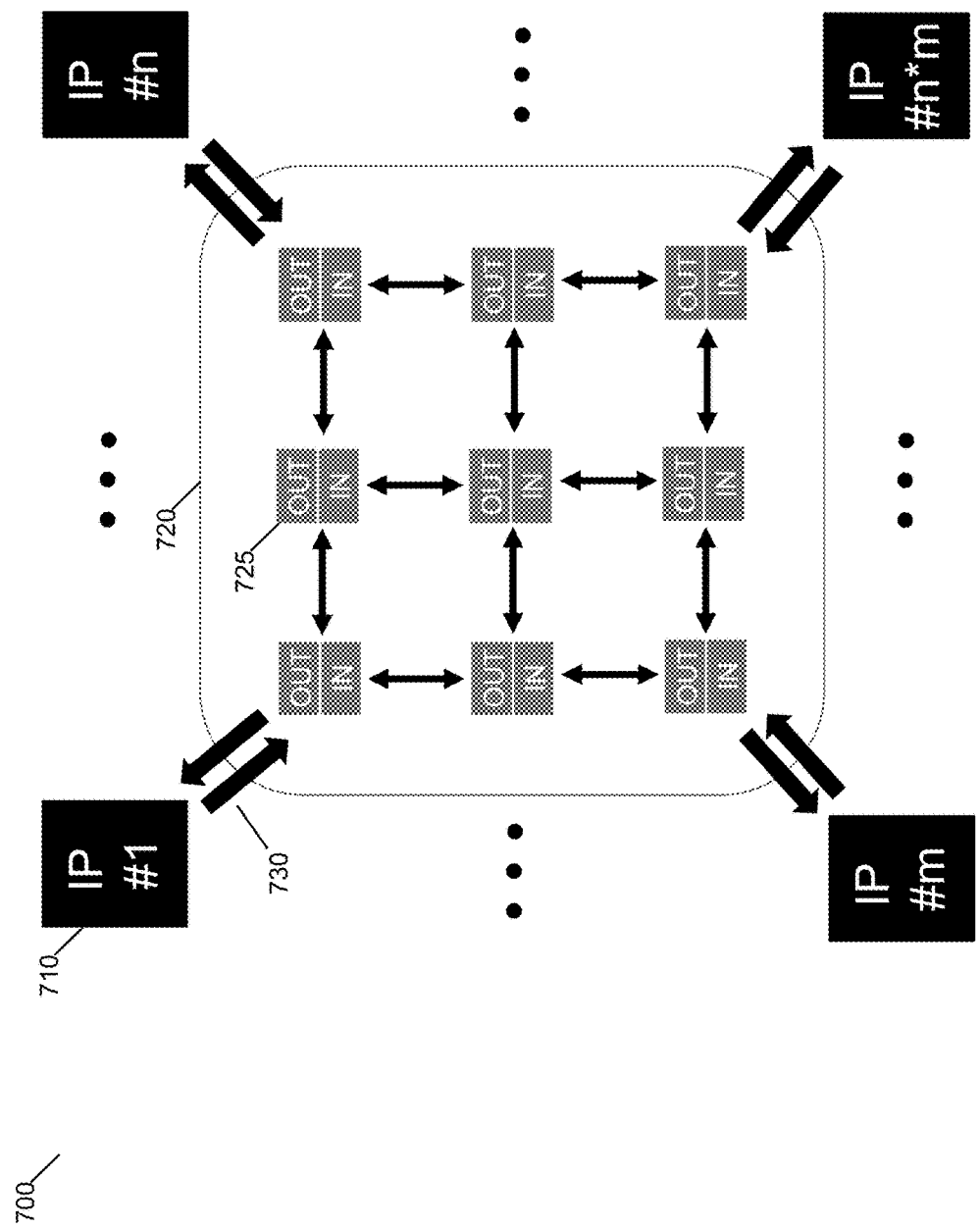
FIG. 7 is a diagram illustrating a 2D-mesh topology for a NoC implementation that uses the input and output ports of FIGS. 3 and 4 in accordance with one example embodiment.
Figure 8:
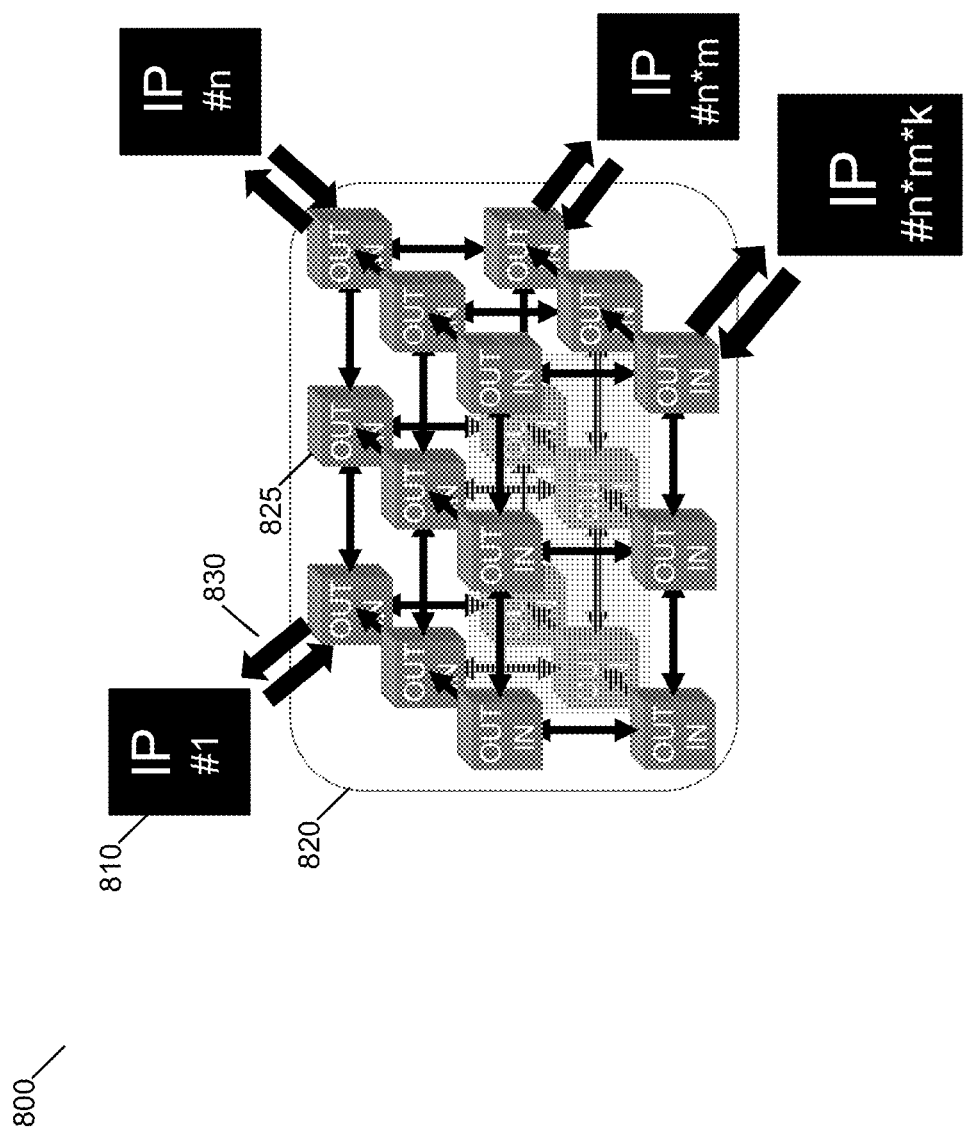
FIG. 8 is a diagram illustrating a 3D-mesh topology for a NoC implementation that uses the input and output ports of FIGS. 3 and 4 in accordance with one example embodiment.
Figure 9:
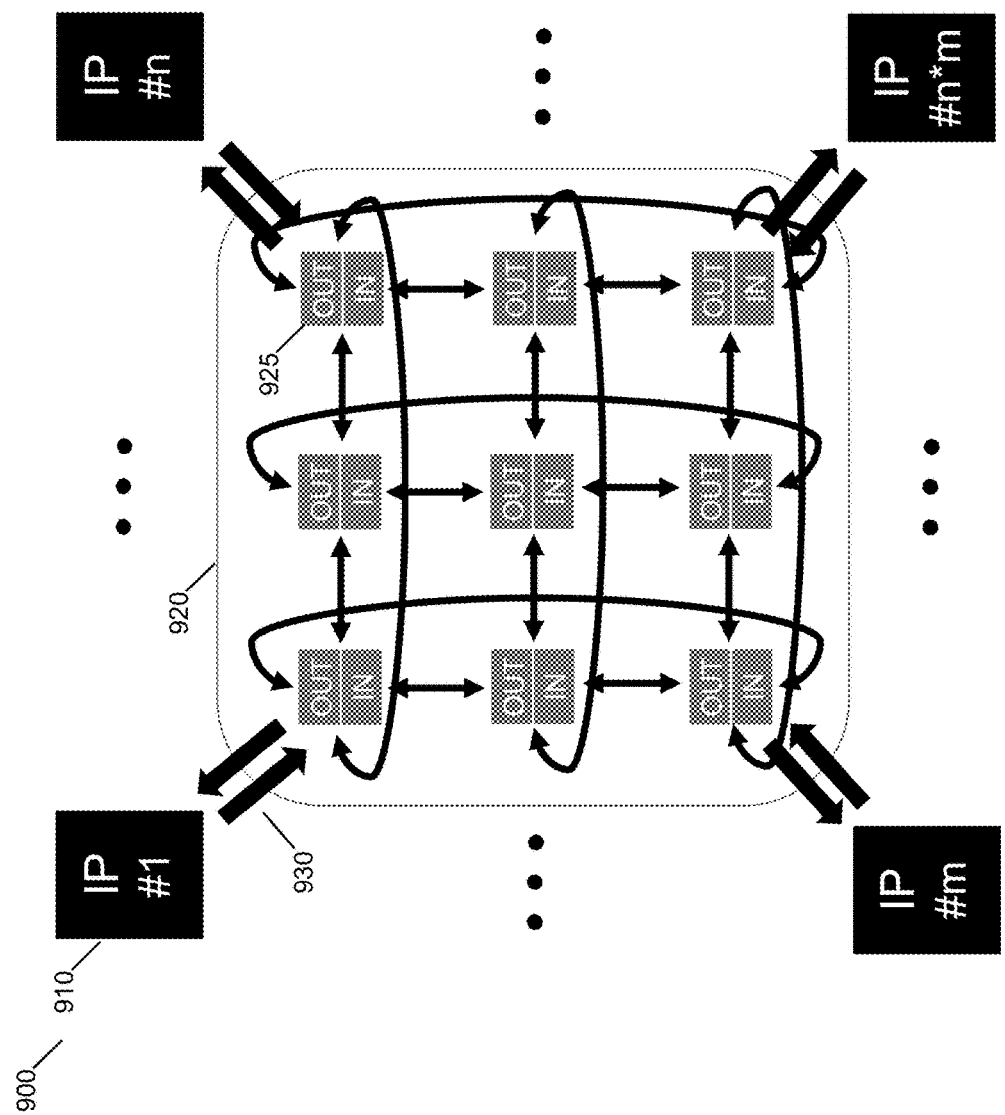
FIG. 9 is a diagram illustrating a 2D-tourus topology for a NoC implementation that uses the input and output ports of FIGS. 3 and 4 in accordance with one example embodiment.

By configuring and combining input ports 300 and output ports 400 in different arrangements it is possible to generate more complex IP blocks such as a crossbar 520, as shown in FIG. 5; or even different topologies of a Network on Chip (NoC) implementation: such as a ring 620, in FIG. 6; a 2D-mesh 720, in FIG. 7; a 3D-mesh 820, in FIG. 8; a 2D-torus 920, in FIG. 9, or even a 3D-torus.

For example, FIG. 6 illustrates an implementation of a NoC with ring topology 620 connected to the various IP blocks 610 though channels 630, which can be configured as described above. Elements 625 represent clusters of input and output ports, which can be configured in accordance with the embodiments of FIGS. 3 and 4 and which can be connected in different ways to enable different tradeoffs within the specific NoC topology. For example, IP block #1 can use channels 630 with compression ratio of 4, but IP block #2 can use channels with compression ratio of 8. Each input/output buffer 625 needs to use the corresponding ratio for each particular IP block. This same principle applies to the other topologies as well for the input/output buffer.

Figure 10:
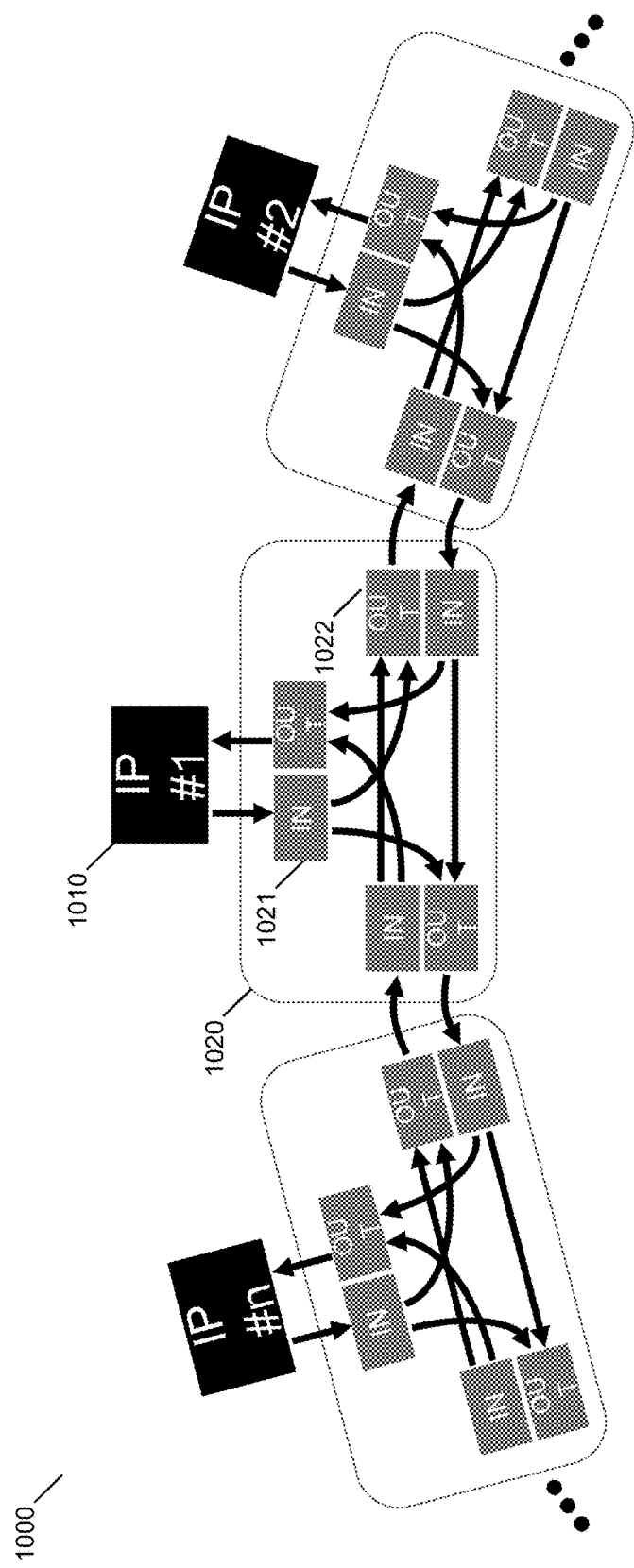
FIG. 10 a diagram illustrating a ring topology for a NoC implementation where routing and arbitration are distributed and that uses the input and output ports of FIGS. 3 and 4 in accordance with one example embodiment.

By using input and output ports, such as those described herein as basic elements to build the various topology of IP blocks a high degree of versatility can be achieved between specific implementations. For example, FIG. 10 shows the details of a ring NoC input/output cluster 1020. In this specific implementation, three input ports 1021, and three output ports 1022, all configured as described herein can be used. No explicit virtual channels are shown in the block diagram. By arranging the input and output ports in this configuration, the routing and arbitration is distributed among the different input and output ports in a node.

Figure 11:
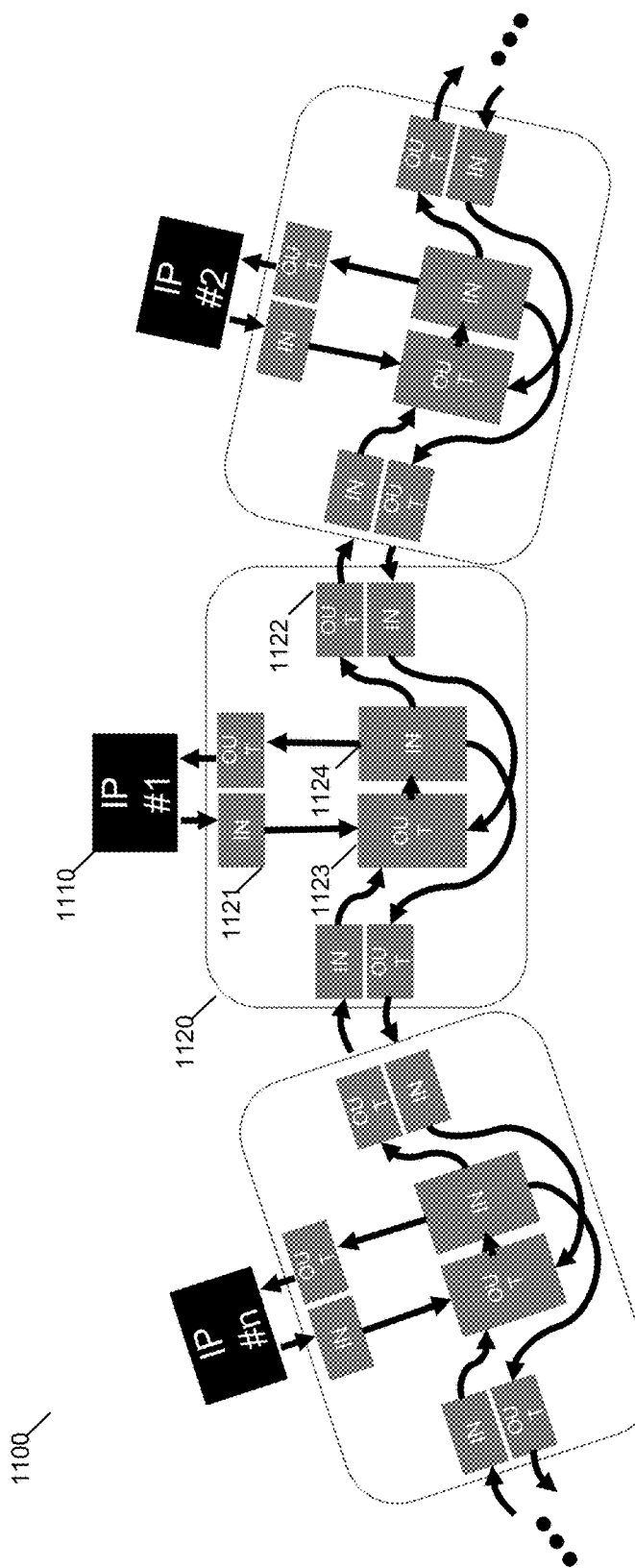
FIG. 11 a diagram illustrating a ring topology for a NoC implementation with shared routing and arbitration and that uses the input and output ports of FIGS. 3 and 4 in accordance with one example embodiment.

FIG. 11 shows a ring NoC router 1120 with centralized routing and arbitration. In this example implementation, three input ports 1121, and three output ports 1122, all configured as described herein can be used inside a router to interface with two other routers and an IP block. Internally, these interfacing input ports are all connected to a single and centralized cluster of an output port 1123 and an input port 1124. Also, the outputs of this centralized cluster are connected to the three interfacing output ports of the router. In this scheme, each of the three interfacing input ports can have a converter from a channel as well as buffers to increase throughput and specific QoS/FT schemes; however, the router has only one direction to go, which is the centralized cluster, where transmission will be arbitrated by a single output port and then routed by a single input port. Similarly, the interfacing output ports can have converters, buffers and QoS/FT schemes; however, their arbiter is simplified, to simply a buffer, as there is only one possible port for incoming transmissions. Note that, depending on QoS requirements, these interfacing input and output ports can employ more complicated routing and arbitration schemes, e.g. combined to more centralized clusters of output and input ports allowing the usage of virtual channels, where each cluster is implemented with only one input port 1121, and one output port 1122, allowing for a centralized routing and arbitration architecture. No explicit virtual channels are shown in the block diagram.

FIG. 5 illustrates the implementation of a crossbar 520, connected to the various IP blocks 510, though channels 530, which can be configured as described above. Elements 525 represent clusters of input and output ports that can be configured as described herein and that can be connected in different ways to enable different tradeoffs within the specific crossbar, e.g., as explained before for the NoC ring 620 implementation.

FIG. 7 illustrates the implementation of a NoC with 2D-mesh topology 720, connected to the various IP blocks 710, though channels 730, which can be configured as described above. Elements 725 represent clusters of input and output ports that can be configured as described herein and that can be connected in different ways to enable different tradeoffs within the specific crossbar, e.g., as explained before for the NoC ring 620 implementation.

FIG. 8 illustrates the implementation of a NoC with 3D-mesh topology 820, connected to the various IP blocks 810, though channels 830, which can be configured as described above. Elements 825 represent clusters of input and output ports that can be configured as described herein and that can be connected in different ways to enable different tradeoffs within the specific crossbar, e.g., as explained before for the NoC ring 620 implementation.

FIG. 9 illustrates the implementation of a NoC with 2D-torus topology 920, connected to the various IP blocks 910, though channels 930, which can be configured as described above. Elements 925 represent clusters of input and output ports that can be configured as described herein and that can be connected in different ways to enable different tradeoffs within the specific crossbar, e.g., as explained before for the NoC ring 620 implementation.

Figure 12:
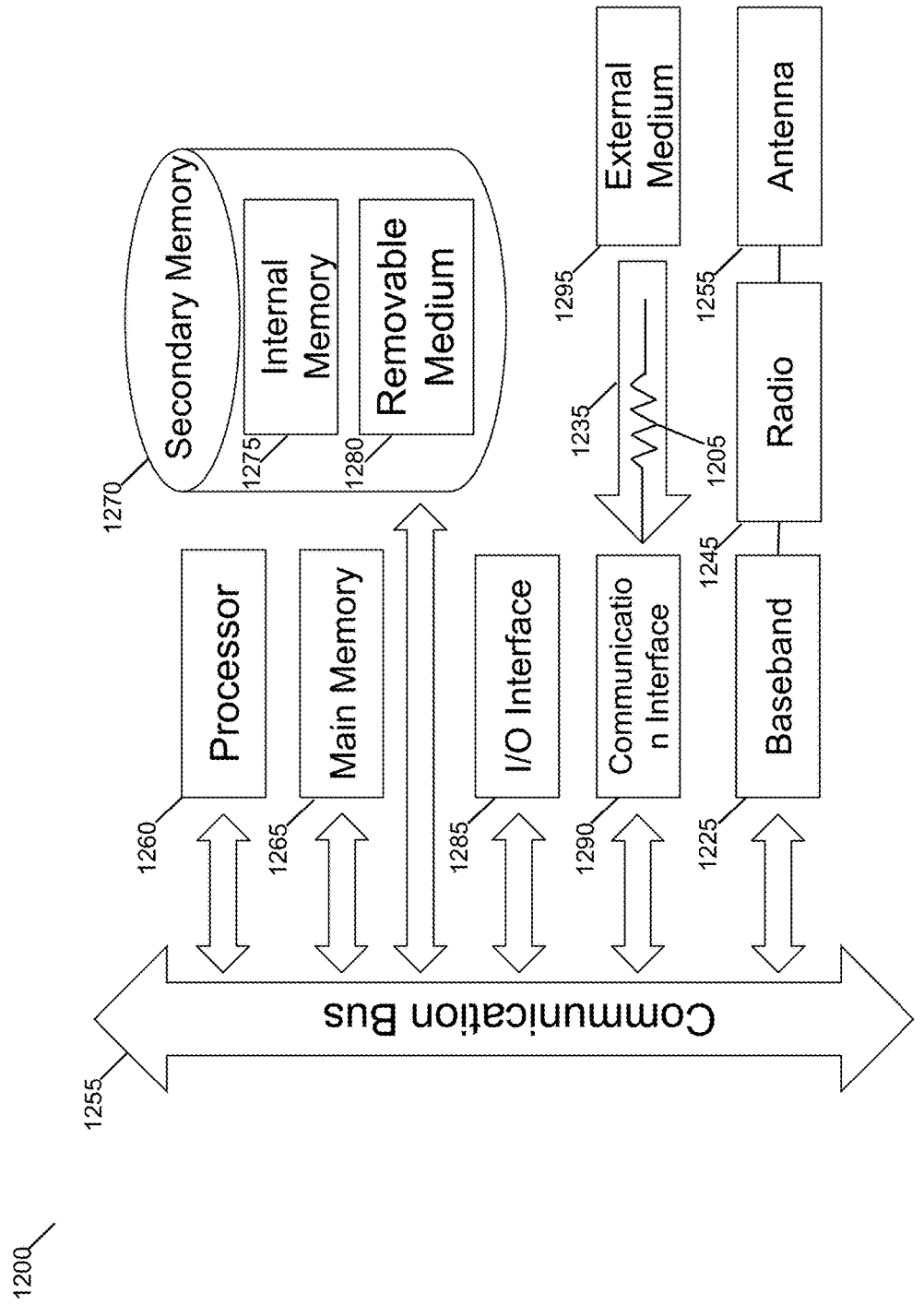
FIG. 12 shows a wired or wireless system that can be used to perform the processes described herein.

FIG. 12 is a block diagram illustrating a wired or wireless system 1200 according to various embodiments. Referring to FIGS. 5, 6 and 7, the system 1200 may be used to perform the process 600. In various embodiments, the system 1200 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 1200 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1260.

The processor 1260 is preferably connected to a communication bus 1255. The communication bus 1255 may include a data channel for facilitating information transfer between storage and other peripheral components of the system 1200. The communication bus 1255 further may provide a set of signals used for communication with the processor 1260, including a data bus, address bus, and control bus (not shown). The communication bus 1255 may comprise any standard or non-standard bus architecture such as, for example, bus architectures compliant with industry standard architecture ("ISA"), extended industry standard architecture ("EISA"), Micro channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The system 1200 preferably includes a main memory 1265 and may also include a secondary memory 1270. The main memory 1265 provides storage of instructions and data for programs executing on the processor 1260. The main memory 1265 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1270 may optionally include an internal memory 1275 and/or a removable medium 1280, for example a floppy disk drive, a magnetic tape drive, a compact disc ("CD") drive, a digital versatile disc ("DVD") drive, etc. The removable medium 1280 is read from and/or written to in a well-known manner. Removable medium 1280 may be, for example, a floppy disk, magnetic tape, CD, DVD, SD card, etc.

The removable medium 1280 is a non-transitory computer readable medium having stored thereon computer executable code (i.e., software) and/or data. The computer software or data stored on the removable medium 1280 is read into the system 1200 for execution by the processor 1260.

In alternative embodiments, secondary memory 1270 may include other similar means for allowing computer programs or other data or instructions to be loaded into the system 1200. Such means may include, for example, an external medium 1295 and a communication interface 1290. Examples of external medium 1295 may include an external hard disk drive or an external optical drive, or and external magneto-optical drive.

Other examples of secondary memory 1270 may include semiconductor-based memory such as programmable read-only memory ("PROM"), erasable programmable read-only memory ("EPROM"), electrically erasable read-only memory ("EEPROM"), or flash memory (block oriented memory similar to EEPROM). The removable medium 1280 and the communication interface 1290 allow software and data to be transferred from the external medium 1295 to the system 1200.

The system 1200 may also include an input/output ("I/O") interface 1285. The I/O interface 1285 facilitates input from and output to external devices. For example the I/O interface 1285 may receive input from a keyboard or mouse and may provide output to a display. The I/O interface 1285 is capable of facilitating input from and output to various alternative types of human interface and machine interface devices alike.

The communication interface 1290 allows software and data to be transferred between system 1200 and external devices (e.g. printers), networks, or information sources. For example, computer software or executable code may be transferred to system 1200 from a network server via communication interface 1290. Examples of communication interface 1290 include, for example, but not limited to, a modem, a network interface card ("NIC"), a wireless data card, a communications port, a PCMCIA slot and card, an infrared interface, and an IEEE 1394 fire-wire.

The communication interface 1290 preferably implements industry promulgated protocol standards, such as Ethernet IEEE 802 standards, Fiber channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 1290 are generally in the form of electrical communication signals 1205. In one exemplary embodiment, these electrical communication signals 1205 are provided to the communication interface 1290 via a communication channel 1235. In one embodiment, the communication channel 1235 may be a wired or wireless network, or any variety of other communication links. The communication channel 1235 carries the electrical communication signals 1205 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 1265 and/or the secondary memory 1270. Computer programs can also be received via communication interface 1290 and stored in the main memory 1265 and/or the secondary memory 1270. Such computer programs, when executed, enable the system 1200 to perform the various functions of the present invention as previously described.

In this description, the term "computer readable medium" is used to refer to any non-transitory computer readable storage media used to provide computer executable code (e.g., software and computer programs) to the system 1200. Examples of these media include the main memory 1265, the secondary memory 1270 (including the internal memory 1275, the removable medium 1280, and the external medium 1295), and any peripheral device communicatively coupled with the communication interface 1290 (including a network information server or other network device). These non-transitory computer readable mediums are means for providing executable code, programming instructions, and software to the system 1200.

In one embodiment implemented using software, the software may be stored on a computer readable medium and loaded into the system 1200 by way of the removable medium 1280, the I/O interface 1285, or the communication interface 1290. In such an embodiment, the software is loaded into the system 1200 in the form of electrical communication signals 1205. The software, when executed by the processor 1260, preferably causes the processor 1260 to perform the inventive features and functions previously described herein.

The system 1200 also includes optional wireless communication components that facilitate wireless communication over a voice and over a data network. The wireless communication components comprise an antenna system 1255, a radio system 1245 and a baseband system 1225. In the system 1200, radio frequency ("RF") signals are transmitted and received over the air by the antenna system 1255 under the management of the radio system 1245.

In one embodiment, the antenna system 1255 may comprise one or more antennae and one or more multiplexors (not shown) that perform a switching function to provide the antenna system 1255 with transmit and receive signal paths. In the receive path, received RF signals can be coupled from a multiplexor to a low noise amplifier (not shown) that amplifies the received RF signal and sends the amplified signal to the radio system 1245.

In alternative embodiments, the radio system 1245 may comprise one or more radios that are configured to communicate over various frequencies. In one embodiment, the radio system 1245 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 1245 to the baseband system 1225.

If the received signal contains audio information, then baseband system 1225 decodes the signal and converts it to an analog signal. Then the signal is amplified and sent to a speaker. The baseband system 1225 may also receive analog audio signals from a microphone. These analog audio signals are converted to digital signals and encoded by the baseband system 1225. The baseband system 1225 also codes the digital signals for transmission and generates a baseband transmit audio signal that is routed to the modulator portion of the radio system 1245. The modulator mixes the baseband transmit audio signal with an RF carrier signal generating an RF transmit signal that is routed to the antenna system 1255 and may pass through a power amplifier (not shown). The power amplifier amplifies the RF transmit signal and routes it to the antenna system 1255 where the signal is switched to the antenna port for transmission.

The baseband system 1225 may also be communicatively coupled with the processor 1260. The processor 1260 has access to main memory 1265 and/or secondary memory 1270. The processor 1260 is preferably configured to execute instructions (i.e., computer programs or software) that can be stored in the main memory 1265 or the secondary memory 1270. Computer programs can also be received from the baseband system 1225 and stored in the main memory 1265 or in secondary memory 1270, or executed upon receipt. Such computer programs, when executed, enable the system 1200 to perform the various functions of the present invention as previously described. For example, the main memory 1265 may include various software modules (not shown) that are executable by processor 1260.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A circuit comprising:
   a buffer stage configured to receive data streams from a bundle of channels;
   a router configured to decompress the data streams and select appropriate output channels from a plurality of output channels and forward the data streams to the appropriate output channels, wherein the selection of the appropriate output channel is influenced to maintain bandwidth requirements; and output buffers configured to receive the data streams from the router and output the data streams to a plurality of output channels.

2. The circuit of claim 1, further comprising a converter configured to receive the data streams from the bundle of channels and convert input encoding of the received data streams to an encoding desired within an associated IP block.

3. The circuit of claim 1, wherein the buffer stage is coupled with the converter and configured to improve throughput of a data-path.

4. The circuit of claim 1, wherein the output buffers are configured to improve throughput from the router to the plurality of output channels.

5. The circuit of claim 1, further comprising a Quality of Service (QOS)/Fault Tolerant (FT) block configured to influence the selection.

6. The circuit of claim 5, wherein the selection is based on at least one or more of (i) routing priority for resource sharing so that QoS is maintained, (ii) to avoid faulty link paths, or (iii) adjusting priority of concurrent or parallel data streams.

7. The circuit of claim 1, wherein the router is further configured to decompress Quality of Service (QoS) information when the compression ratio used in the bundle of input channels is greater than 1.

8. The circuit of claim 1, further comprising a crossbar configured to route a plurality of channel bundles, the crossbar comprising a plurality of input/output port clusters, wherein at least one cluster comprises an input port and an output port, the input port comprising the buffer stage, the router, and the output buffers.

9. The circuit of claim 1, further comprising a Network on a Chip (NoC) configured to route a plurality of channel bundles, the NoC comprising a plurality of input/output port clusters, wherein at least one cluster comprises an input port and an output port, the input port comprising the buffer stage, the router, and the output buffers.

10. The circuit of claim 1, further comprising an output port configured to accept multiple bundles of channels at an input and to arbitrate and convert at least one of the bundles of channels to an associated output, wherein the multiple bundles of channels receive data streams via the plurality of output channels.

11. A circuit comprising:
input buffer stages configured to accept multiple bundles of input channels, the multiple bundle of input channels associated with data streams;
an arbiter configured to select which data streams of the multiple bundle of channels to forward along a data path, wherein the selection is influenced to maintain bandwidth requirements along the data path; and
an output buffer configured to receive the selected data stream and forward to an output channel.

12. The circuit of claim 11, wherein the input buffer stages are configured improve throughput for the data streams associated with the multiple bundles of input channels.

13. The circuit of claim 11, further comprising a converter configured to receive the selected data streams and to convert data encoding for the data streams to the encoding desired at an associated output.

14. The circuit of claim 11, wherein the output buffer is configured to improve throughputs to the converter.

15. The circuit of claim 11, further comprising a Quality of Service (QOS)/Fault Tolerant (FT) block configured to influence the selection.

16. The circuit of claim 15, wherein the selection is based on at least one or more of (i) routing priority for resource sharing so that QoS is maintained, (ii) to avoid faulty link paths, or (iii) adjusting priority of concurrent or parallel data streams.

17. The circuit of claim 11, further comprising a crossbar configured to route a plurality of channel bundles, the crossbar comprising a plurality of input/output port clusters, wherein at least one cluster comprises an input port and an output port, the output port comprising the input buffer stage, the arbiter, and the output buffer.

18. The circuit of claim 11, further comprising a Network on a Chip (NoC) configured to route a plurality of channel bundles, the NoC comprising a plurality of input/output port clusters, wherein at least one cluster comprises an input port and an output port, the output port comprising the input buffer stage, the arbiter, and the output buffer.

19. The circuit of claim 11, further comprising an input port configured to accept a bundle of channels at an input and to convert and route the bundle of channels to a plurality of outputs channels, wherein the multiple bundles of input channels receive data streams via the plurality of output channels.

* * * * *